Sept. 16, 1958     F. A. KORTIER ET AL     2,851,901
PORTABLE VALVE WHEEL CRANK
Filed March 14, 1955

*INVENTORS.*
FLOYD A. KORTIER
GEORGE G. KNEPP
BY
*Leland L. Chapman*
ATTORNEY

United States Patent Office 2,851,901
Patented Sept. 16, 1958

2,851,901

PORTABLE VALVE WHEEL CRANK

Floyd A. Kortier and George G. Knepp, Lima, Ohio, assignors to The Standard Oil Company, Cleveland, Ohio, a corporation of Ohio Application March 14, 1955, Serial No. 494,173

2 Claims. (Cl. 74—557)

The present invention relates to a portable valve wheel crank.

In the modern petroleum and chemical processing industries, valves are commonly used to control the flow of fluids in pipe lines. These valves are often quite large and frequently valves over several feet in diameter are employed. A great number of these valves are operated by hand. Such manually operated valves are usually opened and closed by means of a valve wheel which is attached to the valve stem by a plurality of spokes. In the case of the larger valves, a worker often employs both hands in order to facilitate the rotation of the valve wheel so that the valve may be opened or closed. However, not infrequently, the valve wheels are located in a position such that it is exceedingly difficult for a worker to grasp the valve wheel with both of his hands as he must do in order to rotate the valve wheel with some degree of facility. This may be so either because of the location of the valve wheel relative to its surroundings, or because of the size of the wheel.

Accordingly, it is the object of this invention to provide a means which will facilitate the rotation of a valve wheel and consequently the opening and closing of the valve, and which will be useful in connection with a large number of different valves.

The valve wheel crank of this invention has a number of advantages. By means of this crank it is possible to open and close the larger size valves without the necessity for grasping opposite spokes of the valve wheel with both hands. The valve wheel crank makes it possible to crank the valve, open or shut, by grasping the valve wheel crank at a single place.

Another advantage of a portable valve wheel crank, over one which would be permanently affixed to the valve wheel, is its removability from the valve wheel when not in use which eliminates any danger of a worker inadvertently running into the protruding crank handle.

Still another advantage of the portable valve wheel crank is that one crank may be used for turning a large number of different valves.

The portable valve wheel crank of my invention comprises a tubular member having an aperture therein adapted to engage a corresponding protuberance on an extension of the valve wheel spoke, in combination with a handle member which serves as the crank and is perpendicularly attached to the tubular member. The tubular member which engages the valve wheel may have one or both ends open. The aperture in the tubular member may be located at any point around the circumference of the tubular member and the configuration of the aperture may be varied. It is only necessary that the aperture engage with a corresponding protuberance on the valve wheel spoke extension so that the crank handle will be secured in a position substantially parallel to the valve stem. The handle may be made up of several parts or of a single part. The handle may be affixed to the tubular member in any suitable manner such as by welding, threading, etc. While it is preferable that the tubular member be made out of a metal, it may be advantageous in certain instances to construct the handle member from a different material such as wood or a plastic material.

The invention will be better understood by reference to the several figures of the patent drawing wherein similar numbers denote similar parts throughout.

Figure 1:
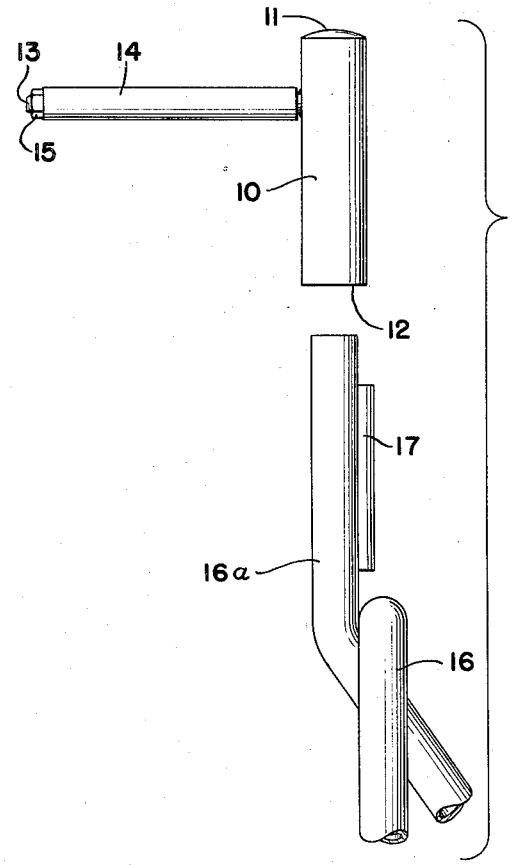
Figure 1 is a side view of a portion of a valve wheel and of the valve wheel crank of this invention.
Figure 3:
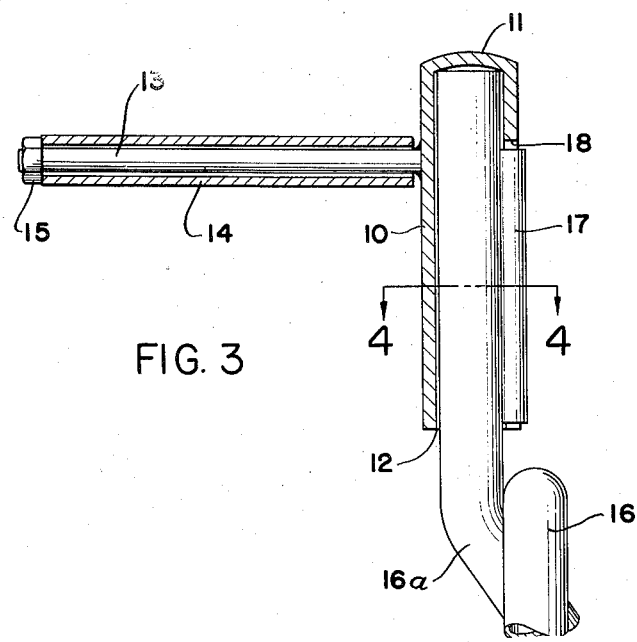
Figure 3 is a side view in partial cross-section of the valve wheel crank in operating engagement with the valve wheel.
Figure 4:
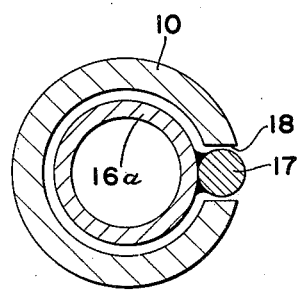
Figure 4 is a cross-sectional view cut on plane 4—4 of Figure 3 looking in the direction of the arrows which shows the means by which the valve wheel crank is prevented from rotating about the valve wheel.

Referring now to Figure 1, a preferred embodiment of the valve wheel crank of this invention comprises a tubular member 10 having a closed end 11 and an open end 12 and a handle member 14 which is secured in position by means of the stud 13, which is fastened perpendicularly to the tubular member 10, and nut 15. A rectangular aperture 18 is provided in the circumferential face of the tubular member 10 opposite to the handle member 14 as shown in Figures 3 and 4. The aperture 18 extends from a point below the top end 11 of the tubular member 10 to the bottom of the tubular member 10 and is open at the end 12.

Figure 2:
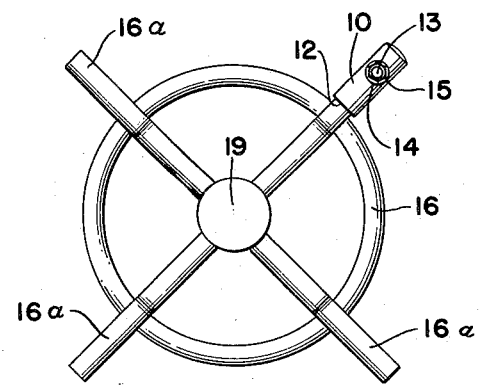
Figure 2 is a top view of a valve wheel showing the valve wheel crank in operative position on the valve wheel.

Considering next Figure 2, a top view of the valve wheel 16 is shown. The extension 16a of the valve wheel spokes are each provided with a protuberance 17 as shown in Figures 3 and 4, which corresponds to the aperture 18 in the valve wheel crank. The protuberance 17 may be simply a small section of metal rod permanently affixed to the valve wheel spoke extension 16a. The protuberance 17 and the aperture 18 in the valve wheel crank are positioned so that the handle member 14 will necessarily be parallel to the valve wheel stem 19 shown on Figure 2 when the crank is in operating position.

Figures 2, 3 and 4 of the drawing illustrate the crank of this invention connected in operating position to the valve wheel 16. It can be seen from the drawing that a worker, by engaging the tubular member 10 of the crank handle with the valve wheel spoke extension 16a and by pulling or pushing the crank handle member 14, can cause a rotational force to be transmitted to the valve wheel stem 19. As the valve wheel 16 is rotated, the worker may remove the crank and attach it to the next valve wheel spoke extension 16a. Thus, this invention makes it possible for a worker to open or close a valve without changing his position and also eliminates the necessity for the worker to grasp opposite valve wheel spoke extensions 16a and apply a torsional force in order to open or close the valve.

This application is intended to cover all modifications of the invention such as would reasonably fall within the scope of the appended claims.

We claim:

1. A portable valve wheel crank comprising a tubular member being open at least one end and being adapted to fit over a valve wheel spoke extension and a handle member attached perpendicularly to said tubular member, said tubular member having an aperture in the circumferential face thereof adapted to engage a corresponding protuberance on a valve wheel spoke extension whereby said tubular member may be temporarily securely engaged with said valve wheel spoke extension and said handle member will be aligned in parallel with a valve stem so that a force applied to said handle member when said tubular member is engaged with said valve wheel spoke extension will cause the valve wheel to rotate.

2. A crank adapted to be used in connection with a valve having a spoked wheel attached to its valve stem whereby the valve may be opened or closed, said wheel having a number of spokes extending beyond the rim thereof which are provided with protuberances thereon, comprising a hollow member adapted to receive one of said valve wheel spoke extensions, said hollow member having an aperture in its longitudinal face adapted to engage said protuberance on said valve wheel extension so as to prevent rotary motion of said hollow member with respect to said spoke extension and a handle member attached perpendicularly to said hollow member.

References Cited in the file of this patent

UNITED STATES PATENTS

| | | |
|---|---|---|
| 1,386,342 | Letchworth | Aug. 2, 1921 |
| 1,426,272 | Banks | Aug. 15, 1922 |
| 1,460,922 | Saunders | July 3, 1923 |
| 1,663,606 | Murphy | Mar. 27, 1928 |
| 1,753,237 | Einfeldt | Apr. 8, 1930 |
| 2,062,108 | Rickerson | Nov. 24, 1936 |

FOREIGN PATENTS

| | | |
|---|---|---|
| 140,296 | Great Britain | Mar. 25, 1920 |

UNITED STATES PATENT OFFICE
CERTIFICATE OF CORRECTION

Patent No. 2,851,901 September 16, 1958

Floyd A. Kortier et al.

It is hereby certified that error appears in the printed specification of the above numbered patent requiring correction and that the said Letters Patent should read as corrected below.

Column 2, line 62, after "open" insert -- at --.

Signed and sealed this 25th day of November 1958.

(SEAL)
Attest:

KARL H. AXLINE  
Attesting Officer

ROBERT C. WATSON  
Commissioner of Patents